(12) United States Patent
Beneker et al.

(10) Patent No.: US 6,896,332 B2
(45) Date of Patent: May 24, 2005

(54) HINGE MOUNTINGS FOR AN ADJUSTING DEVICE OF A MOTOR VEHICLE SEAT

(75) Inventors: Wilfried Beneker, Leichlingen (DE); Burckhard Becker, Solingen (DE); Wilhelm Wingensiefen, Wermelskirchen (DE); Michael Helmer, Solingen (DE)

(73) Assignee: C. Rob Hammerstein GmbH & Co. KG (DE)

( * ) Notice: Subject to any disclaimer, the term of this patent is extended or adjusted under 35 U.S.C. 154(b) by 0 days.

(21) Appl. No.: 10/865,693

(22) Filed: Jun. 10, 2004

(65) Prior Publication Data

US 2004/0251727 A1 Dec. 16, 2004

(30) Foreign Application Priority Data

Jun. 13, 2003 (DE) ........................................ 103 27 090

(51) Int. Cl.[7] ................................................. B60N 2/02
(52) U.S. Cl. ...................................................... 297/362
(58) Field of Search ............................. 297/362, 361.1; 16/221; 475/341, 340, 339, 338, 331

(56) References Cited

U.S. PATENT DOCUMENTS

| | | | | |
|---|---|---|---|---|
| 5,183,447 A | | 2/1993 | Kawakita | |
| 5,336,137 A | * | 8/1994 | Kawakita | 475/347 |
| 5,462,498 A | * | 10/1995 | Lindblad | 475/342 |
| 5,588,932 A | * | 12/1996 | Lindblad | 475/341 |
| 6,331,034 B1 | * | 12/2001 | Specht | 297/362.11 |
| 6,402,248 B1 | * | 6/2002 | Lloyd et al. | 297/362 |

FOREIGN PATENT DOCUMENTS

DE    32 01 309 A1    7/1983

* cited by examiner

Primary Examiner—Milton Nelson, Jr.
(74) Attorney, Agent, or Firm—Akerman Senterfitt

(57) ABSTRACT

A hinge mounting for an adjusting device of a motor vehicle seat has a first hinge arm connected to a first internally toothed external gear wheel and a second hinge arm connected to a second internally toothed external gear wheel and at least two planet wheels, each meshing with both the first external gear wheel and the second external gear wheel. A driver pinion meshes with the planet wheels. A carrier is rotatably disposed about a hinge axis and carries the first planet wheel. A compensation device is disposed between the carrier and the first planet wheel and comprises an elastic member that biases the first planet wheel into engagement with the two external gear wheels.

9 Claims, 5 Drawing Sheets

HINGE MOUNTINGS FOR AN ADJUSTING DEVICE OF A MOTOR VEHICLE SEAT

Figure 1:
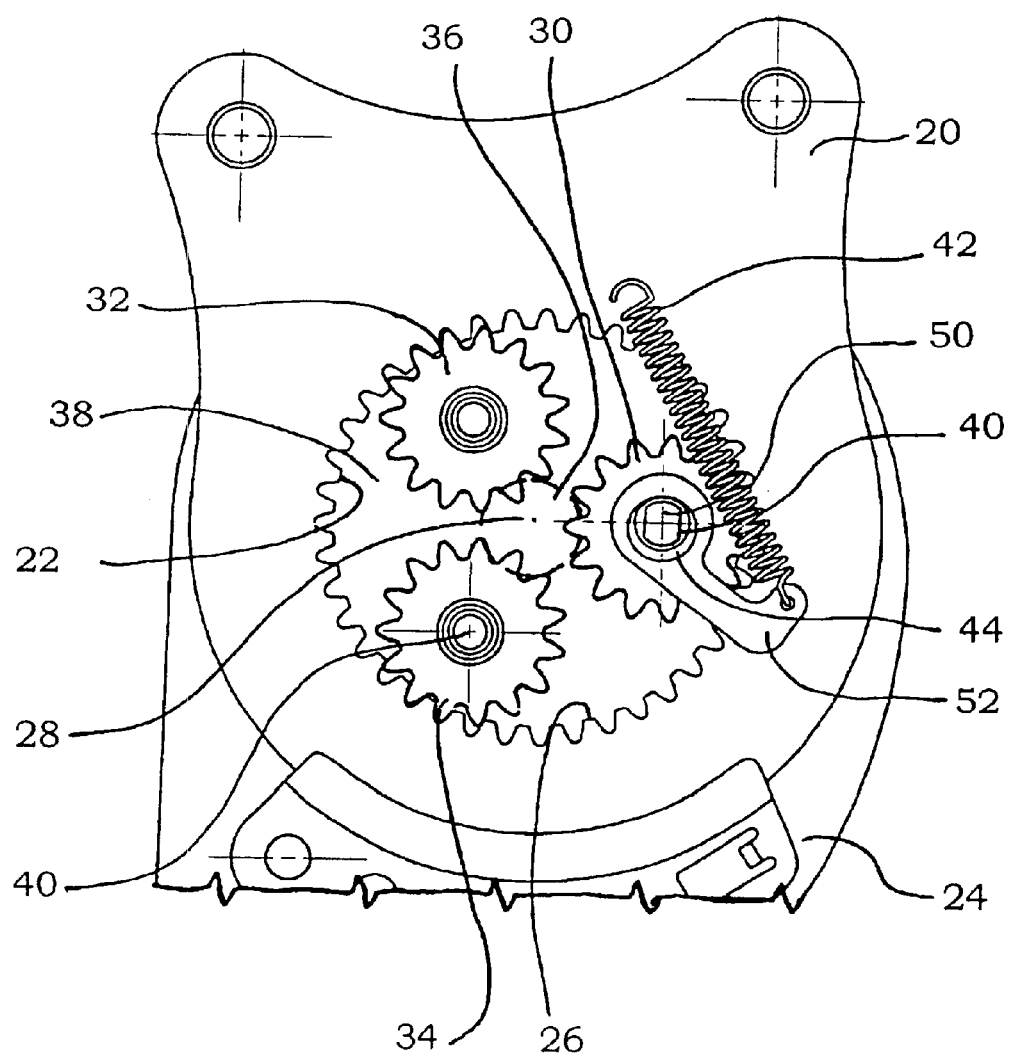

The invention relates to a hinge mountings for an adjusting device of a motor vehicle seat. The hinge mountings has a first hinge arm that is connected to a first internally toothed external gear wheel and a second hinge arm that is connected to a second internally toothed external gear wheel and is adjustable about a hinge axis relative to the first hinge arm. The hinge mountings has at least two planet wheels, each meshing with both the first external gear wheel and the second external gear wheel and being rotatably disposed about a planet wheel axis. A driver pinion meshes with the at least two planet wheels.

Numerous such type hinge mountings have been previously proposed and are notoriously used; examples of such hinge mountings are disclosed by U.S. Pat. No. 5,183,447 and DE 3201309 C2.

In such type hinge mountings, precise meshing of at least one of the planet wheels with the two internal toothed surfaces of the external gear wheels is necessary for providing hinge mountings with zero clearance. Such a hinge mountings being typically used for the reclining angle adjustment of a seat back of a motor vehicle seat and the seat back constituting a quite long lever arm, the hinge mountings must be provided with sufficient little clearance to prevent perceivable play from occurring at the upper edge of the seat back.

This is where the invention comes to bear. It is an object of the invention to further develop the hinge mountings of the type mentioned herein above so that the two hinge arms are retained by at least one of the planet wheels with zero clearance, at any rate with the least possible clearance.

In view of the hinge mountings of the type mentioned herein above, this object is solved by providing a carrier that is rotatably disposed about the hinge axis, by rotatably disposing a first planet wheel of the at least two planet wheels on said carrier so that it is movable relative to said carrier, and by providing a compensation device that is disposed between the carrier and the first planet wheel and comprises an elastic means that biases the first planet wheel into engagement with the two external gear wheels.

One of the planet wheels of said hinge mountings, that is the first planet wheel, is specially disposed and biased for compensating for the clearance. Said first planet wheel does not rotate about a fixed, given axis; it is rather caused by the elastic means to press against the toothed surfaces of the two external gear wheels to provide a zero clearance fit on either side. The first planet wheel is caused to so deeply engage within the two internal toothed surfaces of the external gear wheels that each of the two internally toothed external wheels is retained in either direction of rotation, with no clearance of a rotating wheel in any direction.

In accordance with the invention, clearance is compensated for in that the first planet wheel is movable relative to the carrier. The carrier is the reference point. It rotates about the hinge axis at the same angular speed as the axes of the planet wheels. It may be any shape. It is to be configured such that it takes the reaction force generated by the first planet wheel being caused to press against the two internal toothed surfaces.

The compensation device provides means for pushing the first planet wheel into engagement with the two internal toothed surfaces. The elastic means is an essential part of the compensation device and forms the energy storing means needed to push the first planet wheel into engagement with the teeth. This elastic means preferably acts onto a radial line.

A plurality of embodiments are possible within the scope of the invention. The various embodiments discussed herein are merely exemplary in nature and are not intended to limit the scope of the invention in any manner.

It has been found out that it is particularly advantageous to utilize involute gear teeth for the meshing toothed surfaces. At any rate, the teeth are configured such that they engage into the respective one of the mating toothed surfaces in such a manner that they rather contact each other with their flanks, and are never allowed to reach with their tip the deepest point between two teeth of the mating toothed surface. As a result thereof, curved flank lines are particularly advantageous.

The compensation device operates outside the range of self-locking. That is to say that it is capable of yielding when subject to great enough a counter force, meaning that the first gear wheel can be moved away from the teeth of the two internal toothed surfaces.

The spring force of the elastic means is dimensioned so that the teeth of the first planet wheel come to rest against the internal toothed surfaces of the external gear wheels in such a manner that at least two flanks of each external gear wheel are brought to fit that are pointing into opposed directions of rotation.

For compensating for the clearance, the first planet wheel is preferably displaced in the radial direction. This radial displacement or another type of displacement is provided in an advantageous developed implementation in order to prevent the first planet wheel from deflecting.

In an advantageous developed implementation, the compensation device has a short shaft portion mounted off center. It forms two bearing regions that are axially offset. One bearing region is off-centered and is configured for the first planet wheel for example, whereas the other bearing region is centered and is for example intended to bear the carrier. For this purpose, the carrier comprises a bearing hole. The elastic means causes the shaft portion to rotate in one direction of rotation in such a manner that the first planet wheel is pushed into engagement with the two external gear wheels so as to provide the zero clearance fit described.

In another, simpler implementation, the carrier comprises a longitudinal guide in which the first planet wheel is allowed to move substantially in the radial direction. The compensation device is substantially formed by an elastic pushing member, such as a rubber body, that pushes the planet wheel into engagement with the two external gear wheels.

Figure 2:
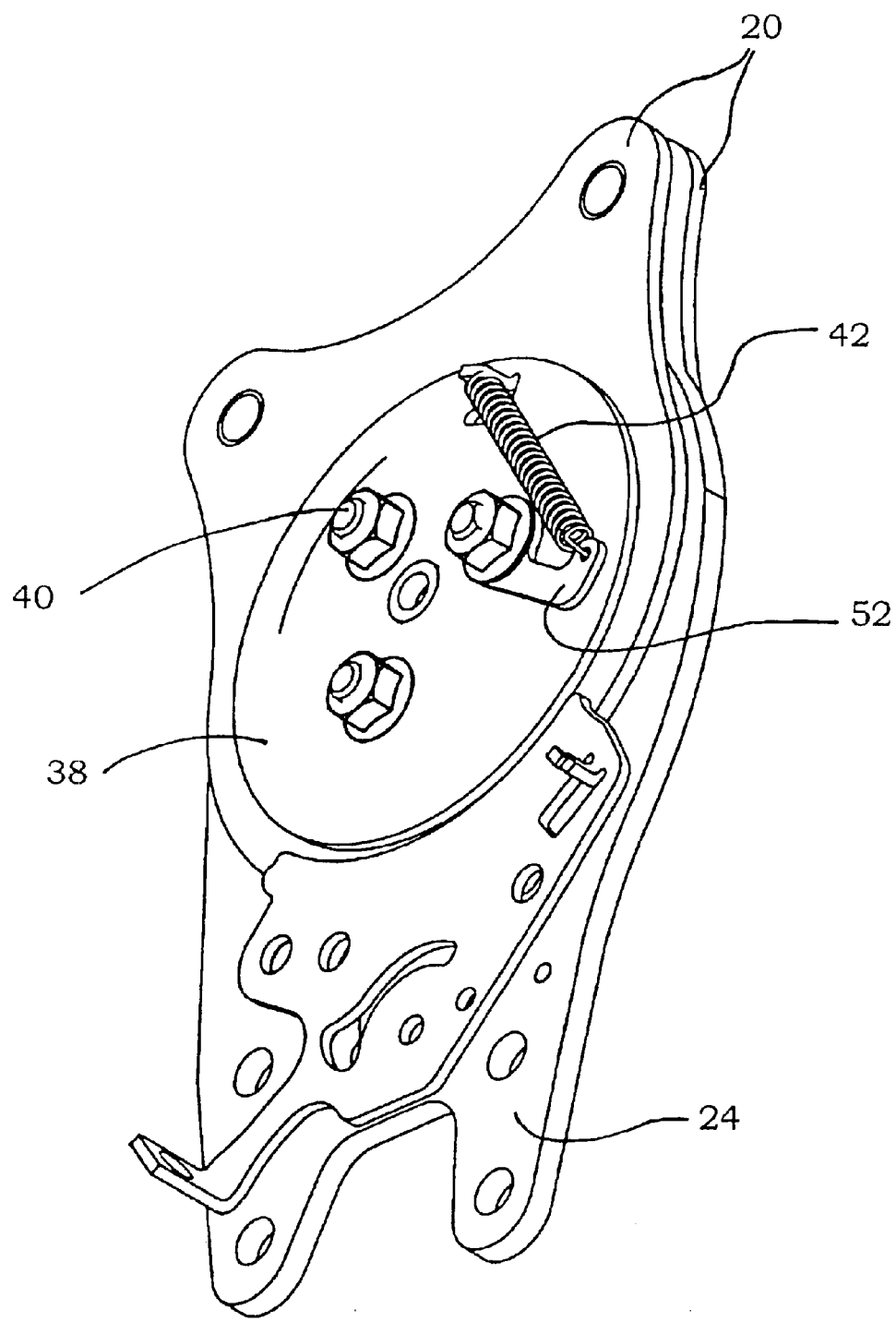
Figure 3:
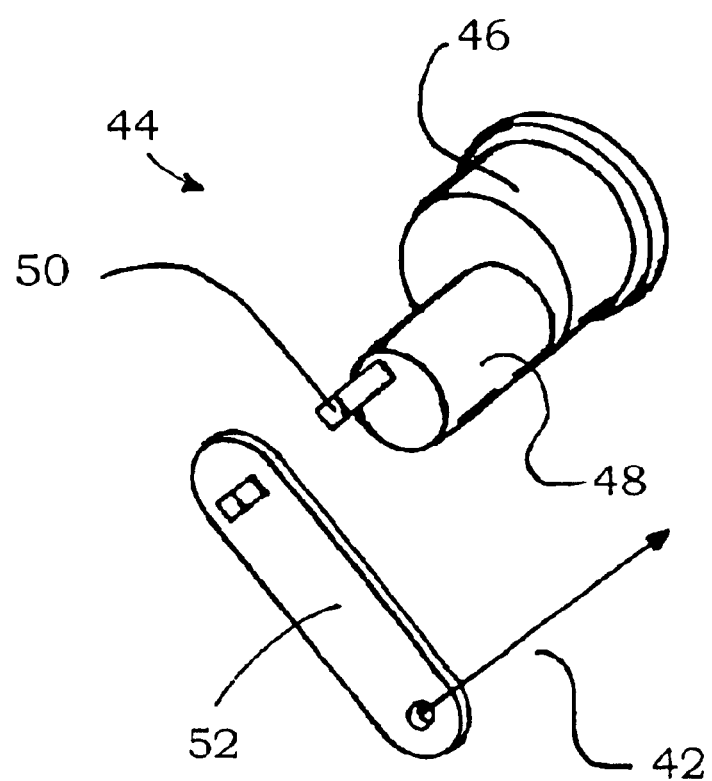
Figure 4:
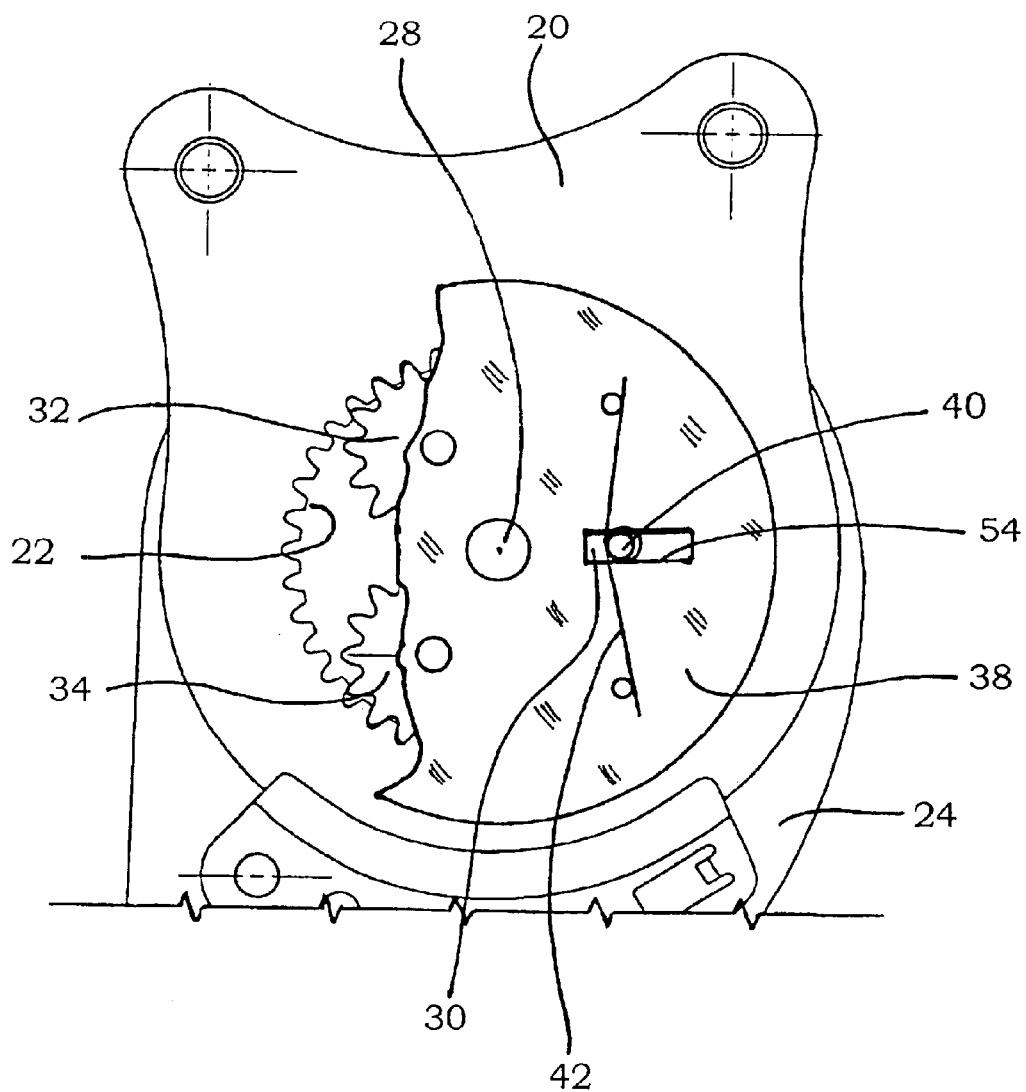
Figure 5:
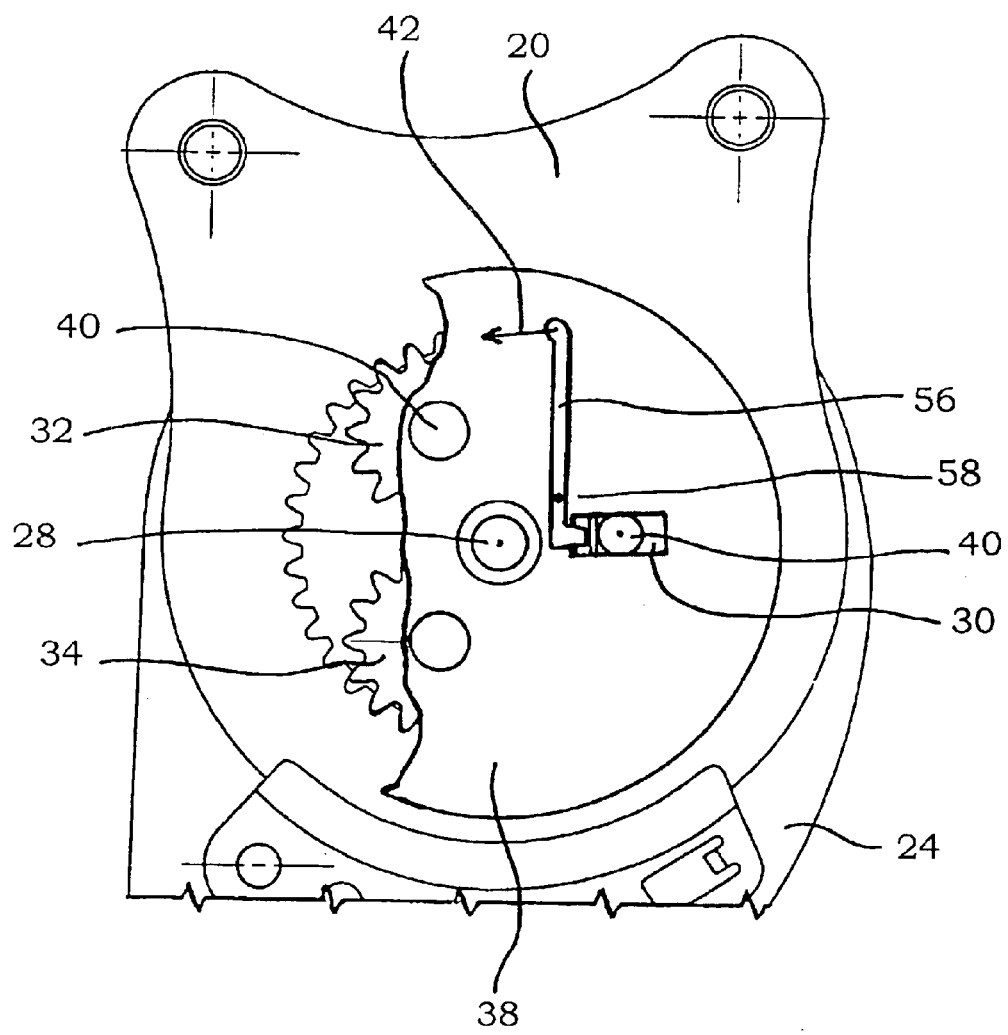

Further advantages and characteristics of the invention will be readily understood upon a reading of the claims and of the following non restrictive description of embodiments thereof, given by way of example only with reference to the drawing in which:

FIG. 1 is a top view of a hinge mountings of the invention, partially open,

FIG. 2 is a perspective illustration of the hinge mountings of FIG. 1, now closed, FIG. 3 is a perspective illustration of an off-center mounted shaft portion of the hinge mountings of the FIGS. 1 and 2, FIG. 4 is a basic illustration of a hinge mountings having a radial slot for guiding the first planet wheel and a corresponding elastic means, FIG. 5 shows an implementation similar to FIG. 4, but this time with an adjusting means comprising a lever.

In a known manner, the hinge mountings comprises a first hinge arm 20 that is connected to a first internally toothed external gear wheel 22 and a second hinge arm 24 that is connected to a second internally toothed external gear wheel 26. The two hinge arms 20, 24 are rotatable and adjustable relative to each other about a hinge axis 28.

Altogether three planet wheels 30, 32, 34, which are built according to the same principle, mesh with the two toothed external gear wheels 22, 26. They mesh both with the first external gear wheel 22 and with the second external gear wheel 26. The external gear wheels 22, 26 differ in the total number of their teeth, in the concrete implementation they differ by three teeth. The planet wheels 30–34 mesh with a pinion 36 that rotates about the hinge axis 28. It is driven by a motor or a handle in a known manner, which is the reason why neither of them is shown.

For reasons of simplification, the differing number of teeth of the two external gear wheels 22, 26 is not shown in detail in the FIGS., this difference is known in principle and needs not be illustrated separately.

Each planet wheel 30–34 comprises a planet wheel axis about which it rotates during adjusting movement.

There is provided a carrier 38 which consists, in each of the three exemplary embodiments shown, of two disks between the two of which there are disposed the hinge arms 20, 24. The carrier 38 rotates about the hinge axis 28 at the same angular speed as the planet wheel axes 40. All of the planet wheel axes 40 of the three planet wheels 30–34 are rotatably carried within the carrier 38. The planet wheels 30–34 are located between the two disk parts of the carrier 38. In principle, and as evidenced by the hinge mountings disclosed in the two documents cited, the planet wheel needs not be carried within a carrier. Accordingly, it is not necessary to have the planet wheels 32 and 34 rotatably carried within carrier 38. A carrier 38 is needed for the first planet wheel 30. This first planet wheel 30 differs from the other planet wheels 32, 34 in that it additionally comprises a means for compensating for a clearance. Such a means needs not be provided on the other planet wheels.

Clearance compensation relies on the fact that the first planet wheel 30 is movable and adjustable relative to the carrier 38 by the action of an elastic means 42. The elastic means 42 is a constituent part of a compensation device comprising at least said elastic means 42, but mostly further parts as well.

In the embodiment in accordance with the FIGS. 1–3, the compensation device comprises a shaft portion 44 that is mounted off center and is shown in FIG. 3. It has a centered bearing region 46 that extends through a mating bearing hole provided in the carrier 38. It further has a bearing region 48 that is off-centered. The latter is adapted to the first planet wheel 30. The first planet wheel rotates about the bearing region 48. The shaft portion 44 further comprises a neck 50 that is disposed in a centric manner and which, in the implementation shown, has a square shape. Through said neck, a torque is transmitted into the off center mounted shaft portion 44. For this purpose there is provided an arm 52 that is part of the compensation device and is attached at an aperture onto the neck 50. At its other end, it is biased in one direction of rotation by the elastic means 42 which, in the first embodiment discussed herein, is configured to be a tension spring.

Since the first planet wheel 30 is mounted off center, it is capable of moving relative to the carrier 38. The elastic means causes the first planet wheel 30 to push its teeth into the toothed surfaces of the two external wheels 22, 26 until the tooth flanks come into contact with a zero clearance fit between the two hinge arms 20, 24.

In the first exemplary embodiment in accordance with the FIGS. 1–3, the compensation device is characterized by a transmission. The eccentric increases the force of the spring, it acts as a lever arrangement. Further, but a short portion of the whole spring travel of the elastic means 42 is utilized. Such compensation devices are particularly preferred that are provided with a mechanical transmission and in which but a portion of the entire spring travel of the elastic means 42 is being utilized.

The desired adjusting force needed to bring the teeth of the first planet wheel 30 into contact with the toothed surfaces of the two wheels 22, 26 in such a manner that tooth flanks of each of the external wheels 20, 26 pointing into two different directions fit against tooth flanks of the first planet wheel 30 is achieved by selecting the spring force, the length of the arm 52, the diameter of the respective one of the two bearing regions 46, 48 and the relative offset thereof.

In the embodiment of FIG. 4, that is in the second exemplary embodiment, the planet wheel axis 40 of the first planet wheel 30 is received and guided in a long hole 54 that is provided in the carrier 38 and is oriented substantially radially. A torsion spring, which forms the elastic means 42 and is supported by two abutments, biases the first planet wheel 30 radially outward. The long hole 54 is part of the compensation device, the spring 42 as well. The long hole 54 is formed within the carrier 38. The arrangement described can be provided on either side, meaning on the two disks of the carrier 38, although it is sufficient to have this arrangement on one side only.

In the exemplary embodiment of FIG. 4, no transmission is provided. By selecting the appropriate spring, it is possible to utilize a low-cost spring on the one side and to only use a fraction of the spring travel on the other side. A rubber piece could be utilized in lieu of the torsion spring 42 shown, said rubber piece being disposed between the planet wheel axis 40 of the first planet wheel 30 and the end of the long hole 54 pointing toward the hinge axis 28. In such a solution, which is also included in this invention, almost the entire spring travel of the rubber piece forming the elastic means 42 would be needed.

FIG. 5 shows in principle another variant of the means for compensating for a clearance in a third exemplary embodiment. Again there is provided, in at least one disk of the carrier 38, a long hole 54 in which the planet wheel axis 40 of the first planet wheel 30 is retained so as to be radially slidable. Through a two arm lever 56, which is carried at 58, the force of the elastic means 42 is geared and transmitted to the planet wheel axis 40 so as to push said planet wheel axis outward. Again, clearance is compensated for, just as in the other exemplary embodiments.

What is claimed is:

1. A hinge mounting for an adjusting device of a motor vehicle seat, said hinge mounting comprising:
   a first hinge arm connected to a first internally toothed external gear wheel,
   a second hinge arm connected to a second internally toothed external gear wheel and adjustable about a hinge axis relative to the first hinge arm,
   at least two planet wheels, each meshing with both the first external gear wheel and the second external gear wheel and being rotatably disposed about a respective planer wheel axis and
   a driver pinion that meshes with the at least two planet wheels,
   wherein a carrier is provided that is rotatably disposed about the hinge axis, a first planet wheel of the at least two planet wheels is rotatably disposed on said carrier and is movable relative to said carrier, and a compensation device is provided which compensation device is disposed between the carrier and the first planet wheel and comprises an elastic means biasing the first planet wheel into engagement with the two external gear wheels.

2. The hinge mounting in accordance with claim 1, wherein the carrier comprises a guide means, the first planet wheel is disposed within the guide means and the first planet wheel is movable relative to the carrier.

3. The hinge mounting in accordance with claim 1, wherein the compensation device comprises a shaft position mounted off center and comprising an off-centered bearing region for the first planet wheel and a centered bearing region for the carrier, the carrier has a bearing hole mating with the centered bearing region and the elastic means elastically biases the shaft portion in one direction of rotation and pushes the first planet wheel into engagement with the two external gear wheels.

4. The hinge mounting in accordance with claim 1, wherein the elastic means pushes the first planet wheel into engagement on either side of the first planet wheel with the teeth of both the first internally toothed external gear wheel and the second internally toothed external gear wheel.

5. The hinge mounting in accordance with claim 1, wherein the number of teeth of the first internally toothed external gear wheel differs from the number of teeth of the second internally toothed external gear wheel.

6. The hinge mounting in accordance with claim 1, wherein the number of teeth of the first internally toothed external gear wheel differs from the number of teeth of the second internally toothed external gear wheel by the number of planet wheels.

7. The hinge mounting in accordance with claim 1, wherein the compensation device is configured with a means to prevent self-locking.

8. The hinge mounting in accordance with claim 1, wherein the toothed surface of at least the first planet wheel or of the two external gear wheels comprises curved flank lines.

9. The hinge mounting in accordance with claim 8, wherein the toothed surface of at least the first planet wheel or of the two external gear wheels utilizes involute gear teeth.

* * * * *